(12) United States Patent
Chen

(10) Patent No.: US 11,260,308 B1
(45) Date of Patent: Mar. 1, 2022

(54) SWINGSET FRAME

(71) Applicant: Samuel Chen, Causeway Bay (HK)

(72) Inventor: Samuel Chen, Causeway Bay (HK)

(*) Notice: Subject to any disclaimer, the term of this patent is extended or adjusted under 35 U.S.C. 154(b) by 0 days.

(21) Appl. No.: 17/225,918

(22) Filed: Apr. 8, 2021

(51) Int. Cl.
A63G 9/00 (2006.01)
F16B 7/18 (2006.01)
A47D 1/10 (2006.01)
A63G 21/00 (2006.01)

(52) U.S. Cl.
CPC .............. A63G 9/00 (2013.01); F16B 7/182 (2013.01); A63G 21/00 (2013.01)

(58) Field of Classification Search
CPC ... A63G 9/00; A63G 9/02; A63G 9/12; A47D 13/105; A47D 1/10
USPC ................................. 472/118–125
See application file for complete search history.

(56) References Cited

U.S. PATENT DOCUMENTS

| 3,980,667 A | 11/1976 | Tomalinas, Jr. |
| 3,990,667 A * | 11/1976 | Tomalinas, Jr. ..... A47D 13/105 248/370 |
| 5,505,664 A | 4/1996 | Nolan |
| D560,740 S | 1/2008 | Phelps et al. |
| 7,909,738 B2 | 3/2011 | Chen |
| 8,079,915 B2 | 12/2011 | Spencer et al. |
| 8,715,095 B2 | 5/2014 | Hsieh |
| 9,061,213 B2 | 6/2015 | Hsu et al. |
| 2010/0048311 A1* | 2/2010 | Spencer ................. A63G 31/00 472/118 |

* cited by examiner

Primary Examiner — Kien T Nguyen
(74) Attorney, Agent, or Firm — Clement Cheng

(57) ABSTRACT

A swingset has a swingset frame. A horizontal member has a first horizontal section, and a second horizontal section. The first horizontal section has a swaged connection to the second horizontal section. The first horizontal section and the second horizontal section are formed of tube metal. A first horizontal section swaged portion fits within the second horizontal section. A pair of first legs support the first horizontal section, and a pair of second legs support the second horizontal section. The pair of first legs engage to a pair of first leg sockets formed on the first horizontal section. The pair of second legs engage to second leg sockets formed on the second horizontal section. A swing is suspended from the horizontal member. A lower tension bracket is mounted on a lower wall of the first horizontal section.

12 Claims, 3 Drawing Sheets

SWINGSET FRAME

FIELD OF THE INVENTION

The present invention is in the field of swingset frames.

DISCUSSION OF RELATED ART

A variety of different swingset frames have been taught in the prior art. Many of the swingset frames provide a support for a frame structure that can withstand cyclical loads of a swinging user.

For example, in U.S. Pat. No. 7,909,738 entitled Trampoline swing by inventor Samuel Chen published Mar. 22, 2011 the abstract discloses, "A trampoline swing has a swing assembly, a trampoline assembly and a trampoline to swing connection member connecting the horizontally oriented trampoline frame to a trampoline connection end of the swing assembly. The trampoline swing has a top bar having a pair of apexes, namely a left apex and a right apex. The left apex is at a left side of the swing assembly and the right apex is at the right side of the swing assembly. There are four main body leg supports, namely a front left leg support, a front right leg support, a rear left leg support, and a rear right leg support. The left apex receives the front left leg support and the rear left leg support. The right apex receives the front right leg support and the rear right leg support. A plurality of swing connectors are mounted on the top bar."

For example, in U.S. Pat. No. 8,715,095 entitled Outdoor playground with shading apparatus by inventor Paul Hsieh, published May 6, 2014 the abstract discloses, "An outdoor playground includes a first and a second entertainment units connected with each other. The first entertainment unit includes a first utility frame configured to allow a predetermine entertainment function to be carried out by the first utility frame and a first shading apparatus detachably mounted on the first utility frame for effectively shielding the first utility frame. The second entertainment unit includes a second utility frame configured to allow a predetermine entertainment function to be carried out by the second utility frame, and a second shading apparatus detachably mounted on the second utility frame for effectively shielding the second utility frame so as to allow the entertainment function to be carried out under shading."

For example, in U.S. Pat. No. 9,061,213 entitled Swing set by inventor Yaw Yuan Hsu et al., published Jun. 23, 2015 the abstract discloses, "A swing set (10) is shown including a support beam (16), a plurality of legs (14), and swing apparatus (18, 24, 26) supported by the support beam. The support beam and legs include a plurality of tubes (28, 30, 38, 40, 44) coupled together by connectors (42, 48). The connectors include an inner tube (66) and a cover (68, 68') positioned over the inner tube. Feet (46) are provided at the lower ends of the legs that rotate relative to the legs."

For example, in U.S. Pat. No. 3,990,667 entitled Swing and support frame assembly therefor by inventor William R. Tomalinas, Jr., published Nov. 9, 1976 the abstract discloses, "A support frame for a swing having bouncing pendular motion includes a pair of mutually inclined U-shaped frames and a pair of support brackets. The brackets space the upper portions of the frames from one another, inhibit relative lateral movement between the frames, cooperate with aligned openings to position the frames in an inclined manner, support the swing directly, and distribute force loads of the swing to horizontally extending surfaces of the frames. In addition, the swing support frame is adapted for disassembly into 14 pieces sized to facilitate their commercial transportation by merely disassembling eight connecting assemblies."

Moreover, in U.S. Pat. No. 5,505,664 entitled Articulated swing by inventor Robert J. Nolan., published Apr. 9, 1996 the abstract discloses, "A children's swing ride is composed of an articulated seating platform having an axis of articulation. A pair of hangers is connected to the seating platform on opposite sides of that axis and a pair of levers extends from the platform on opposite sides of that axis. In use, the platform is suspended by way of the hangers from an overhead support so that riders sitting on opposite ends of the platform can swing back and forth and, by exerting force on the other rider's lever, cause articulation of the seating platform."

Additionally, in U.S. Pat. No. 8,079,915 entitled Playground equipment by inventor Don Spencer et al. published Dec. 20, 2011 the abstract discloses, "will A support member for playground equipment may include a first section with a flared end and a second section with a tapered end. An opening may be disposed in the flared end of the first section and an elongated slot may be disposed in the tapered end of the second section. When the tapered and flared ends are initially connected, the openings may be aligned and a fastener may be inserted into the aligned openings. When the tapered and flared ends are forced together and overlap a greater amount, which may create a more secure connection, the fastener may help keep in the first and second sections in alignment and may help prevent unintended rotational movement of the first and second sections."

Also, in U.S. design Pat. No. D56074051 entitled Playground equipment by inventor Bryan Phelps et al. published Jan. 29, 2008 shows an ornamental design for playground equipment.

SUMMARY OF THE INVENTION

A swingset has a swingset frame. A horizontal member has a first horizontal section, and a second horizontal section. The first horizontal section has a swaged connection to the second horizontal section. The first horizontal section and the second horizontal section are formed of tube metal. A first horizontal section swaged portion fits within the second horizontal section. A pair of first legs support the first horizontal section, and a pair of second legs support the second horizontal section. The pair of first legs engage to a pair of first leg sockets formed on the first horizontal section. The pair of second legs engage to second leg sockets formed on the second horizontal section.

A swing is suspended from the horizontal member. A lower tension bracket is mounted on a lower wall of the first horizontal section. A main bolt passes through the first horizontal section, the second horizontal section, and the lower tension bracket. The second horizontal section is sandwiched between the first horizontal section and the lower tension bracket.

A pair of middle legs support the horizontal member. A pair of middle leg sockets are formed on the horizontal member between the pair of first leg sockets and the pair of second leg sockets. The lower tension bracket is welded at a bracket upper weld to the first horizontal section. The bracket upper weld is horizontal. The lower bracket flange extends from the lower tension bracket and terminates at a flange tip.

The bracket inside weld welds the lower tension bracket to the first horizontal section. The bracket inside weld is opposite the flange tip. The lower tension bracket is curved to a rounded lower profile of the horizontal member. The horizontal member is a circular or oval tube meaning that the horizontal member has a circular or oval cross-section when cut. The horizontal member can be a steel tube.

Figure 1:
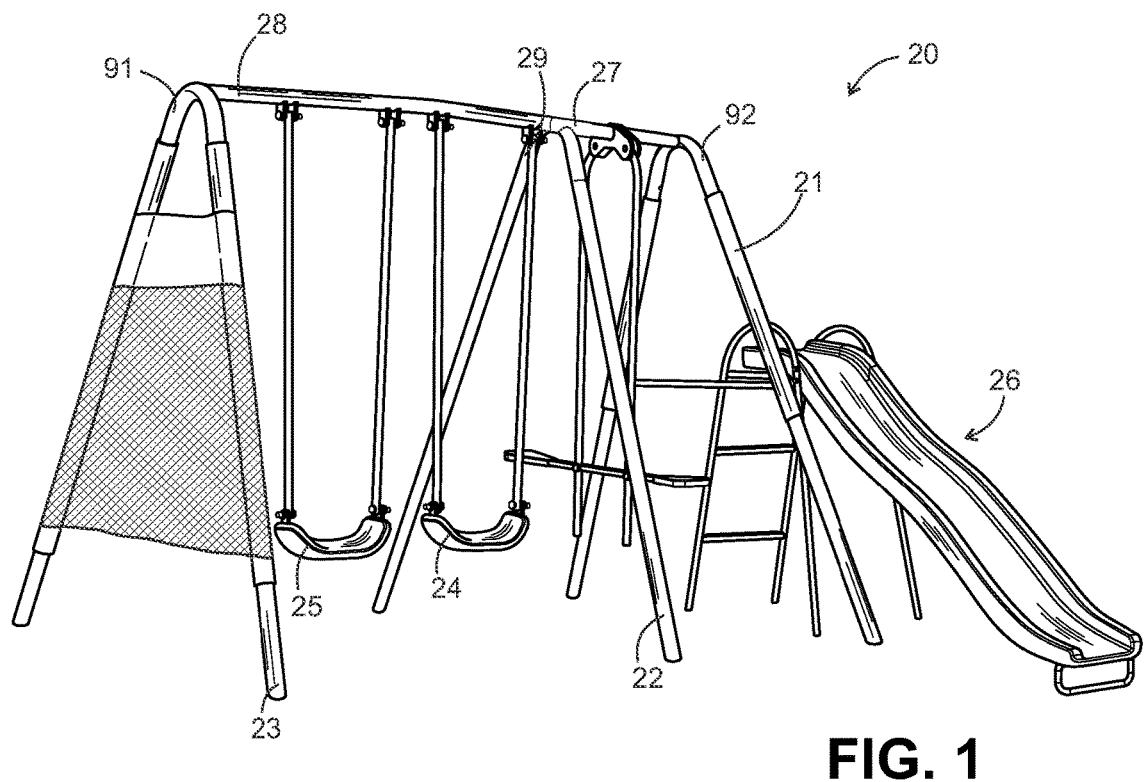
FIG. 1 is a diagram showing a swingset with a slide.

The following call out list of elements can be a useful guide in referencing the element numbers of the drawings.
20 swingset frame
21 right legs
22 middle legs
23 left legs
24 first swing
25 second swing
26 slide
27 right horizontal section
28 left horizontal section
29 horizontal section connection
30 lower tension bracket
31 first bolt
32 second bolt
33 first bolt cover
34 second bolt cover
35 first bolt head
36 second bolt head
37 bracket upper weld
38 bracket inside weld
39 lower bracket flange
41 first middle leg socket
42 second middle leg socket
43 first bolt gasket
44 second bolt gasket
45 flange tip
46 flange opening
81 first cover hinge
82 second cover hinge
91 first leg sockets
92 pair of second leg sockets

DETAILED DESCRIPTION OF THE PREFERRED EMBODIMENT

As seen in FIG. 1, a swingset frame 20 has three pairs of legs, namely a pair of right legs 21, a pair of middle legs 22, and a pair of left legs 23. The swingset frame has at least six legs with a pair of right legs 21, a pair of left legs 23, and a pair of middle legs 22. The left legs support the left horizontal section, and the right legs support the right horizontal section. The middle legs support the left horizontal section and the right horizontal section. The legs are angled in an acute angle and can be inserted into sockets formed on the horizontal sections. Preferably, the left horizontal section 20 is arched with angled upwardly with the horizontal connection 29 near the pair of middle legs 22 higher than the pair of left legs 23 and the pair of right legs 21.

The left horizontal section 20 connects to a right horizontal section 27 at a horizontal connection 29. The first swing 24 and the second swing 25 are hung from the left horizontal section 28, or the right horizontal section 27. Optionally, a slide 26 can be mounted to the right legs 21, or the left legs 23. The right horizontal section 27 is generally parallel to the left horizontal section 28. The horizontal section connection 29 supports the left horizontal section and the right horizontal section.

The left horizontal section can be the first horizontal section, and the right horizontal section can be the second horizontal section. The first horizontal section receives a lower tension bracket. The left pair of legs can be the first pair of legs that fit into a pair of first leg sockets 91. The right pair of legs can be the second pair of legs that fit into the pair of second leg sockets 92.

Figure 2:
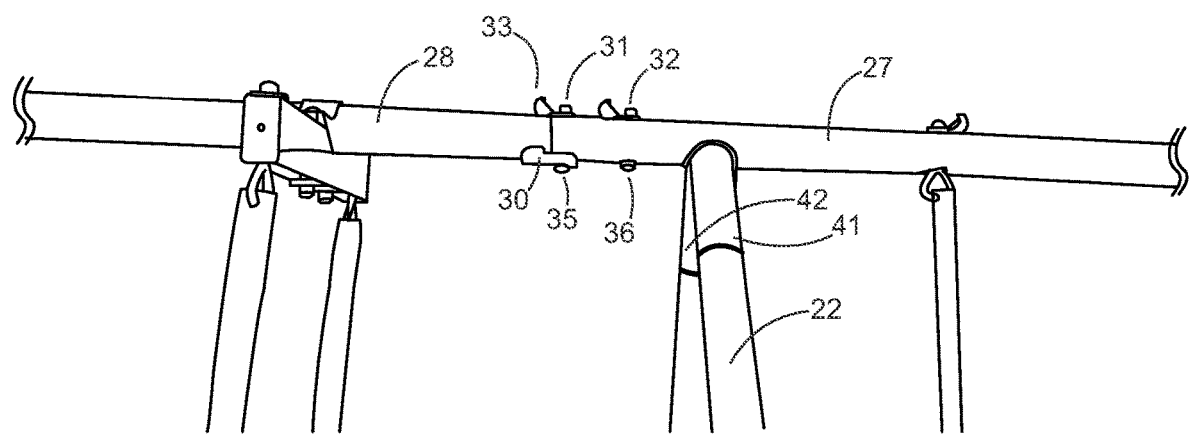
FIG. 2 is a diagram showing a top connection.

As seen in FIG. 2, the horizontal section connection 29 includes a lower tension bracket 30 formed on a horizontal section such as the left horizontal section or the right horizontal section. The lower tension bracket receives a first bolt 31 having a first bolt head 35, and a second bolt 32 having a second bolt head 36. The first bolt 31 may have a first bolt cover 33 covering the first bolt 31. The second bolt 32 may have a second bolt cover 34 covering the second bolt 32. The first bolt 31 is the main bolt, and the second bolt 32 is the secondary bolt. The right horizontal section can be a first horizontal section, and the left horizontal section can be a second horizontal section. Preferably, the lower tension bracket has a curved scoop shape. The curved or scooped shape of the lower tension bracket should have a dimension great enough to resist sideways movement and allows a clamping force with the bolt extending through the concentric telescopically arranged pair of tubes. The sideways movement or swinging force of a user is cyclical. The curved shape of the lower tension bracket provides a curved clamping force.

The first middle leg socket 41 and the second middle leg socket 42 extend at an angle from each other from the right horizontal section 27. Preferably, the leg sockets are welded to the horizontal sections. The lower tension bracket 30 is welded to the left horizontal section 28 and receives the first bolt 31. From top to bottom, the first bolt passes downwardly through an upper wall of the right horizontal section, then an upper wall of the left horizontal section, and then a lower wall of the left horizontal section, then a lower wall of the right horizontal section, then through the lower tension bracket. If the first bolt were to be inserted from bottom to top, the structure would be basically the same.

The middle legs 22 extend from the first middle leg socket 41 in the second middle leg socket 42. The right horizontal section 27 connects to the left horizontal section 28 with the assistance of the lower tension bracket 30. The lower tension bracket 30 sandwiches the lower wall of the right horizontal section 27 between the lower tension bracket 30 and the lower wall of the left horizontal section 28. The first bolt 31 passes through the lower tension bracket 30, but the second bolt 32 need not pass through the lower tension bracket 30. The first bolt cover 33 and the second bolt cover 34 can cover the first bolt head 35 and the second bolt head 36 if the first bolt head 35 and the second bolt head 36 are installed in an upward position. The bolt covers can be made of it elastomeric or plastic materials that are weather resistant. The first middle leg socket 41 and the second middle leg socket 42 preferably our saddle welded to the horizontal sections. The second figure can be an enlarged version of the first figure.

Figure 3:
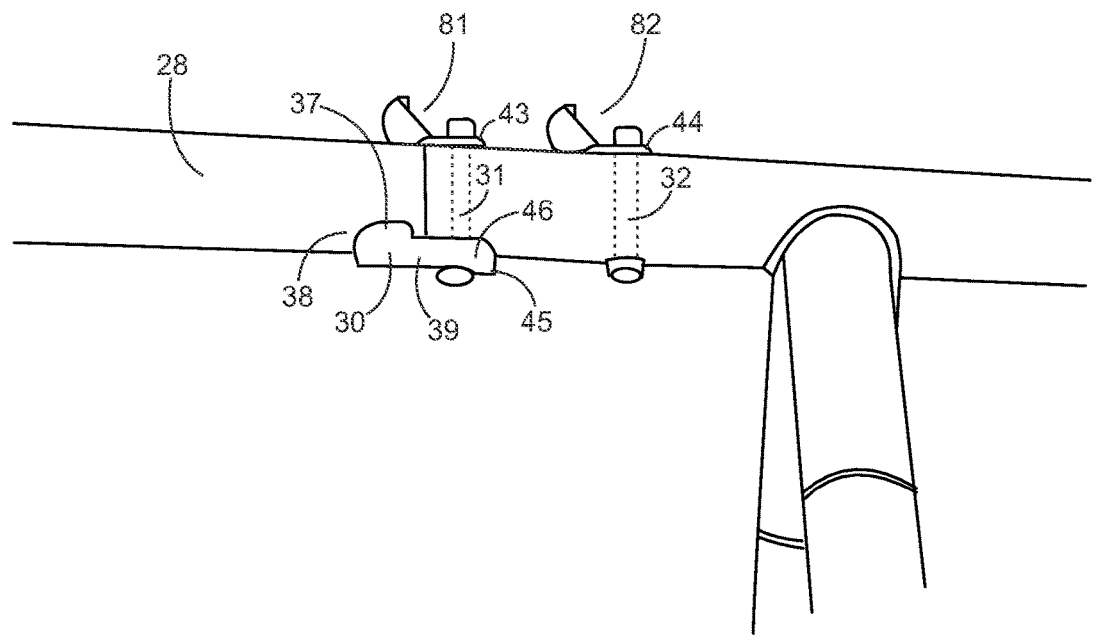
FIG. 3 is a diagram showing a top connection.

As seen in FIG. 3, the lower tension bracket 30 preferably includes a bracket inside weld 38, a bracket upper weld 37 along a left and right upper side of the bracket. The lower tension bracket 30 extends forwardly at a lower bracket flange 39 which extends to a flange tip 45. The bracket inside weld 38 is on a lower side of the lower tension bracket 30, and the bracket upper welds 37 can be along the sides of the bracket.

The lower tension bracket 30 is in tension because the first bolt 31 and the second bolt 32 have a moment force tending to pull and bend the swaged connection where the right horizontal portion is swaged to fit inside the left horizontal portion. The bracket upper weld 37 is preferably parallel to the lower tension bracket 30, and the bracket inside weld 38 is preferably perpendicular to the lower tension bracket 30. The lower bracket flange 39 can be curved so that it conforms to a profile of the right horizontal portion. Optionally, a first bolt gasket 43 and a second bolt gasket 44 can provide a waterproof seal between the bolt head or bold nut and the frame. The flange tip 45 preferably has a flange opening 46. The first cover hinge 81 and the second cover hinge 82 are made of separate pieces of plastic or elastomeric material. The third figure can be an enlarged version of the second figure.

Figure 4:
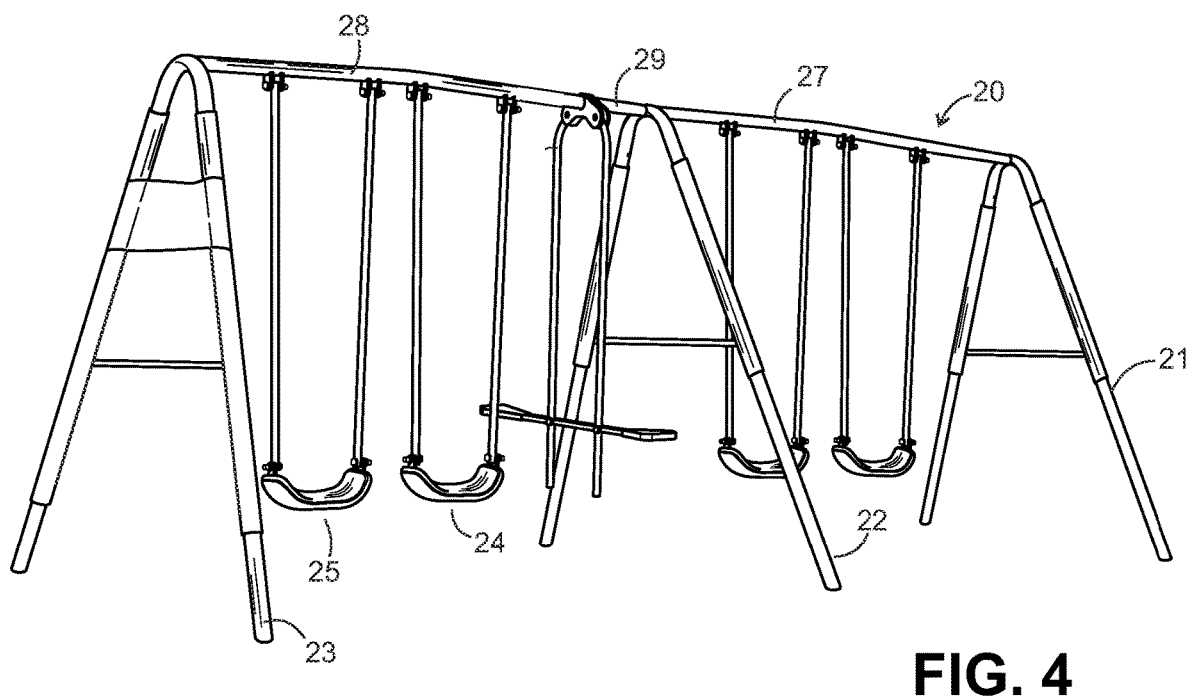
FIG. 4 is a diagram showing a swingset with four swings.

As seen in FIG. 4, the swingset frame 20 has right legs 21, middle legs 22, and left legs 23 supporting a right horizontal section 27 connected to a left horizontal section 28 at a horizontal section connection 29. The horizontal sections support a first swing 24 and a second swing 25 which can be mounted on the left and right horizontal sections, or on the left or right horizontal sections.

Figure 5:
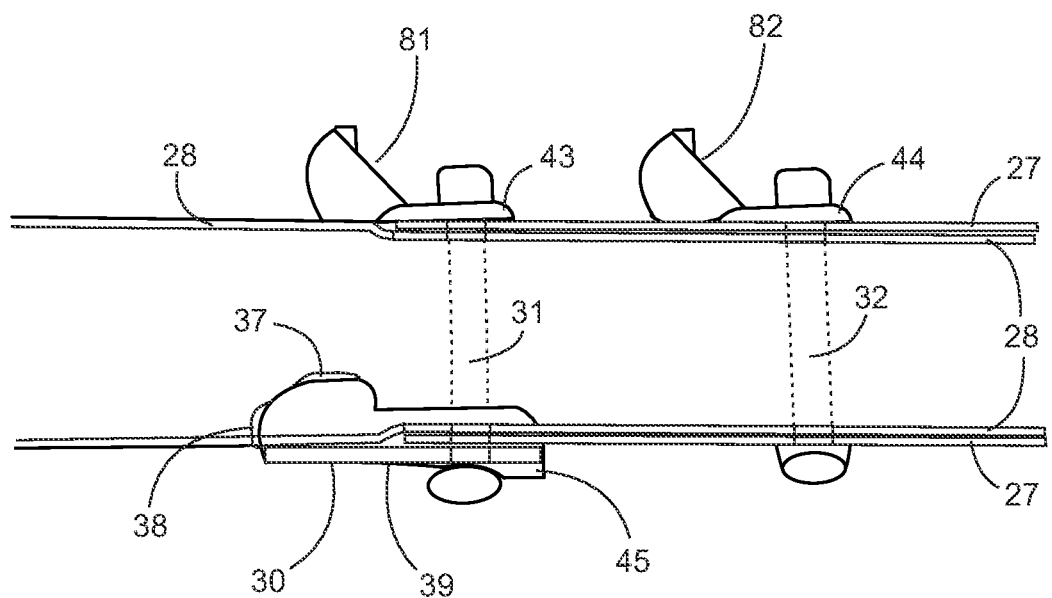
FIG. 5 is a cross-section diagram showing installation of the bolts through the lower tension bracket and swaged tubular horizontal connection.

As seen in FIG. 5 a cross section view of the present invention can be a cross-section of the third figure. The cross-section shows that the first bolt passes through five layers of steel, and the second bolt passes through four layers of steel. The bracket and the inside tube sandwich the outside tube. The inside tube is swaged to receive the outside tube. The inside tube can be swaged to be smaller than the outside tube, or the outside tube can be swaged to be larger than the inside tube.

Figure 6:
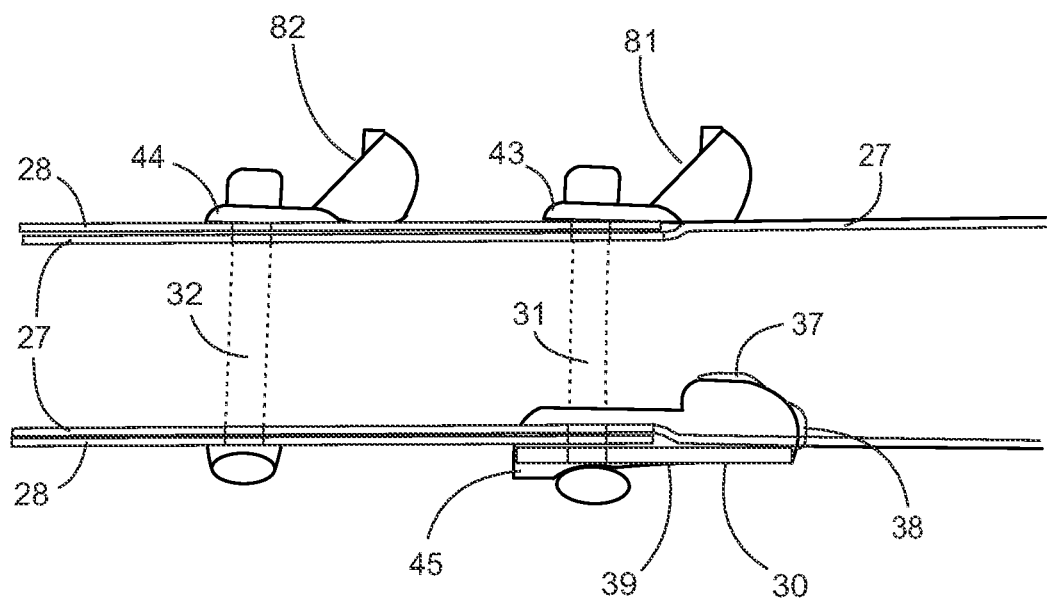
FIG. 6 is a cross-section diagram showing installation of the bolts through the lower tension bracket and swaged tubular horizontal connection.

As seen in FIGS. 5-6, the inside tube can be on the left side or the right side, and the outside tube can be on the opposite side, namely the right side or the left side. The first horizontal section can be swaged to a smaller diameter to fit inside the second horizontal section. The second horizontal section can be swaged to a smaller diameter to fit inside the first horizontal section. The lower tension bracket 30 is mounted on an unswaged portion of the first horizontal section. The first horizontal section has a swaged portion that fits into the second horizontal section in a telescopic connection. The second horizontal section is sandwiched between the first horizontal section and the lower tension bracket 30.

The right or left side may change depending upon the side that the user views the frame. When the user is on one side of the swingset frame, the first horizontal section could be on the right, and then when the user walks over to the other side of the swingset frame, the first horizontal section could then be on the left. Accordingly, FIG. 5 is a view from the swingset frame opposite to FIG. 6. Children will view the swingset from different sides often, especially if they like to run circles around the swingset.

The invention claimed is:

1. A swingset comprising:
   a. a swingset frame including a horizontal member having a first horizontal section, and a second horizontal section, wherein the first horizontal section has a swaged connection to the second horizontal section, wherein the first horizontal section and the second horizontal section are formed of tube metal, wherein a first horizontal section swaged portion fits within the second horizontal section;
   b. a pair of first legs supporting the first horizontal section, and a pair of second legs supporting the second horizontal section, wherein the pair of first legs engage to a pair of first leg sockets formed on the first horizontal section, wherein the pair of second legs engage to second leg sockets formed on the second horizontal section;
   c. a swing suspended from the horizontal member;
   d. a lower tension bracket mounted on a lower wall of the first horizontal section; and
   e. a main bolt, wherein the main bolt passes through the first horizontal section, the second horizontal section, and the lower tension bracket, wherein the second horizontal section is sandwiched between the first horizontal section and the lower tension bracket.

2. The swingset of claim 1, further comprising a pair of middle legs supporting the horizontal member, wherein a pair of middle leg sockets are formed on the horizontal member between the pair of first leg sockets and the pair of second leg sockets.

3. The swingset of claim 1, wherein the lower tension bracket is welded at a bracket upper weld to the first horizontal section.

4. The swingset of claim 3, wherein the bracket upper weld is horizontal.

5. The swingset of claim 1, further including a lower bracket flange extending from the lower tension bracket and terminating at a flange tip.

6. The swingset of claim 5, further including a bracket inside weld that welds the lower tension bracket to the first horizontal section, wherein the bracket inside weld is opposite the flange tip.

7. The swingset of claim 1, wherein the lower tension bracket is curved to a rounded lower profile of the horizontal member, wherein the horizontal member is a circular or oval tube.

8. The swingset of claim 7, further comprising a pair of middle legs supporting the horizontal member, wherein a pair of middle leg sockets are formed on the horizontal member between the pair of first leg sockets and the pair of second leg sockets.

9. The swingset of claim 7, wherein the lower tension bracket is welded at a bracket upper weld to the first horizontal section.

10. The swingset of claim 9, wherein the bracket upper weld is horizontal.

11. The swingset of claim 7, further including a lower bracket flange extending from the lower tension bracket and terminating at a flange tip.

12. The swingset of claim 11, further including a bracket inside weld that welds the lower tension bracket to the first horizontal section, wherein the bracket inside weld is opposite the flange tip.

* * * * *